US008756760B2

(12) United States Patent
Ulbrich-Gasparevic et al.

(10) Patent No.: US 8,756,760 B2
(45) Date of Patent: Jun. 24, 2014

(54) AIRCRAFT CABIN CURTAIN RAIL ASSEMBLY KIT, AIRCRAFT CABIN CURTAIN RAIL AND AIRCRAFT WITH AN AIRCRAFT CABIN HAVING A CURTAIN SUPPORTED ON SUCH AN AIRCRAFT CABIN CURTAIN RAIL

(71) Applicant: Airbus Operations GmbH, Hamburg (DE)

(72) Inventors: Jovan Ulbrich-Gasparevic, Pinneberg (DE); Michael Mosler, Plaisance du Touch (FR); Holger Warner, Jork (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/904,210

(22) Filed: May 29, 2013

(65) Prior Publication Data
US 2013/0318744 A1 Dec. 5, 2013

Related U.S. Application Data (60) Provisional application No. 61/653,568, filed on May 31, 2012.

(30) Foreign Application Priority Data

May 31, 2012 (EP) .................................... 12170335

(51) Int. Cl.
*A47H 13/00* (2006.01)
(52) U.S. Cl.
USPC ..................... 16/87.4 R; 16/93 D; 16/95 R
(58) Field of Classification Search
CPC ....... A47H 15/00; A47H 15/02; A47H 15/04;
A47H 13/00; A47H 13/04; A47H 13/14;
A47H 1/06; E05D 15/063; E05D 15/0613;
E05D 15/0652; E05Y 2201/684; E05Y 2900/142
USPC . 16/87.4 R, 93 D, 94 R, 95 R, 96 R, DIG. 20
See application file for complete search history.

(56) References Cited

U.S. PATENT DOCUMENTS 3,043,408 A * 7/1962 Attwood ......................... 52/842
3,296,651 A * 1/1967 Baker ........................ 16/87.4 R
(Continued)

FOREIGN PATENT DOCUMENTS

| DE | 20 2011 000055 U1 | 2/2012 |
| FR | 1388570 A | 2/1965 |
| WO | 2009/115378 A2 | 9/2009 |

*Primary Examiner* — Roberta Delisle
(74) *Attorney, Agent, or Firm* — Lerner, David, Littenberg, Krumholz & Mentlik, LLP (57) ABSTRACT

An aircraft cabin curtain rail assembly kit includes a plurality of curtain rail components with linear curtain rail sections and curved curtain rail sections with an angle of curvature in a range of 0-90°. Each curtain rail component has a first end and a second end. On the first end, a recess for receiving a fixation protrusion of another curtain rail component is arranged and, on the second end, a fixation protrusion for inserting into a recess of another curtain rail component is present. The recess and the fixation protrusion include a fastening means for fixating the recess and the fixation protrusion relative to each other. Each curtain rail component includes a holder slit for attaching the respective curtain rail component to an object and a curtain slit for guiding curtain rail guiding means in the curtain rail component.

13 Claims, 7 Drawing Sheets

(56) References Cited

U.S. PATENT DOCUMENTS

| | | | |
|---|---|---|---|
| 4,068,345 A | | 1/1978 | Hehl et al. |
| 4,524,698 A | * | 6/1985 | Tourtellier et al. ........... 104/107 |
| 4,747,182 A | * | 5/1988 | Darner ...................... 16/87.4 R |
| 4,769,862 A | * | 9/1988 | Skrzelowski .................... 4/610 |
| 6,807,791 B2 | * | 10/2004 | Herb ............................... 52/846 |
| 2009/0242150 A1 | | 10/2009 | Mosler et al. |
| 2011/0042434 A1 | | 2/2011 | Warner et al. |
| 2011/0191983 A1 | | 8/2011 | Chen |

* cited by examiner

AIRCRAFT CABIN CURTAIN RAIL ASSEMBLY KIT, AIRCRAFT CABIN CURTAIN RAIL AND AIRCRAFT WITH AN AIRCRAFT CABIN HAVING A CURTAIN SUPPORTED ON SUCH AN AIRCRAFT CABIN CURTAIN RAIL

CROSS-REFERENCE TO RELATED APPLICATIONS

This application claims the benefit of the filing date of U.S. Provisional Patent Application No. 61/653,568, filed May 31, 2012, the disclosure of which is hereby incorporated herein by reference.

TECHNICAL FIELD

The invention relates to an aircraft cabin curtain rail assembly kit, an aircraft cabin curtain rail and an aircraft with an aircraft cabin having at least two areas separated by a curtain supported on an aircraft cabin curtain rail.

BACKGROUND OF THE INVENTION

Usually, in common commercial aircraft curtain rails that hold separation curtains are tailored to fit into individual separation regions that provide a separation between adjacent cabin zones, for example between a passenger zone, a galley area or another passenger zone. Usually, a separation curtain may be supported on a curtain rail that extends over a spatially delimited passageway and may thereby extend in a lateral and a longitudinal direction, depending on the actual position of cabin elements that form the passage and to which the curtain rail is connected. As the cabin configuration is highly individual and may define a number of differently designed passageways throughout the cabin a large number of different curtain rail shapes exist. Consequently, late changes in the design of cabin configurations may lead to the necessity of a modification or a complete re-design of a curtain rail.

In WO 2009/115378 A1 curtain header panels are disclosed that comprises a plane base surface that is horizontally mountable in an aircraft cabin, into which base plane two or more parallel holder rails are integrated. Curtain rail holder bodies may be arrested in individual positions in these holder rails, which holder bodies then support the curtain rail. Hence, the curtain rail, especially a linear or longitudinal curtain rail, may be fixed in a variable orientation.

SUMMARY OF THE INVENTION

It may be beneficial to provide an aircraft cabin curtain rail that is tailored to an individually designed separation region in an aircraft cabin, wherein it may also be beneficial to provide necessary modifications very easily in order to eliminate the need for a complete re-design on late changes in the cabin configuration.

Described herein is an aircraft cabin curtain rail assembly kit comprising a plurality of curtain rail components with
  linear curtain rail sections and
  curved curtain rail sections with an angle of curvature in a range of 0-90°, wherein each curtain rail component has a first end and a second end, wherein on the first end a recess for receiving a fixation protrusion is arranged and wherein on the second end a fixation protrusion for inserting into a recess is arranged, wherein the recess and the fixation protrusion comprise a fastening means for fixating the recess and the fixation protrusion relative to each other and wherein each curtain rail component comprises a holder slit for attaching the respective curtain rail component to an object and a curtain slit for guiding curtain rail guiding means in the curtain rail component.

According to an embodiment of the invention an aircraft cabin curtain rail may therefore be created by the use of different curtain rail components that together form an aircraft cabin curtain rail assembly kit. It is to be understood that the curved curtain rail component may be manufactured in a variety of different curvature angles, for example in steps of 5°, 10°, 15° or even larger steps. Furthermore, the linear or longitudinal curtain rail components may be manufactured in a variety of different lengths, while these different lengths may be selected incrementally, e.g. with measures that are dividable by a certain basic measure, for example 5 cm, 10 cm, 20 cm or even larger basic measures. Thereby, lengths of 5 cm, 10 cm, 20 cm, 40 cm etc. may be created, while individual lengths may be achieved through combining different linear curtain rail components of different or the same lengths.

The first end of each curtain rail component is equipped with a recess that is able to receive a protrusion of a second end of another curtain rail component. Therefore, an aircraft cabin curtain rail may be easily created through creation of a chain of different curtain rail components with a pair of a fixation protrusion and a recess at each connection region. The faces of the first end and the second end connected thereto preferably flushly touch each other in a connected state, while the relative positions of the inserted fixation protrusions and the respective recesses are fixed through the fastening means.

The fastening means basically is designed to arrest the fixation protrusion in a respective recess of a curtain rail component in a completely inserted state such that the connected curtain rail components cannot be moved relative to each other, neither inadvertently nor intendedly. The fastening means may be realized as positive locking means or non-positive locking means, i.e. force-fit locking means. The latter may be accomplished with clamping screws or clamping levers. Preferably, the fastening means in the aircraft cabin curtain rail assembly kit according to an embodiment of the invention is a positive locking means. There exist several different kinds of positive locking means that may exemplarily be based on a through-hole that extends through at least one lateral delimiting surface of the recess and the respective fixation protrusion in an inserted state. Thereby, an accessibility of the through-hole may be given from the curtain slit or from the holder slit.

The curtain rail components may be manufactured from any synthetic or natural material that is certified or common for use in aircraft cabins or the like, which material may include e.g. metallic materials, plastic materials, reinforcing fibres or mixtures thereof.

Preferably, the fastening means is a releasable positive locking means. Hence, the fastening means is designed to be easily removed or de-activated such that the connected curtain rail components may be detached from each other again. This simplifies the process of creating an aircraft cabin curtain rail as individual curtain rail components may easily be replaced.

In an advantageous embodiment the fastening means comprises a locking body, which locking body extends from the fixation protrusion perpendicularly to the local longitudinal axis of the respective curtain rail component, wherein the locking body is spring-mounted. In other words, the locking body rises out of a receiving opening situated in the fixation protrusion, thereby extends from the fixation protrusion due to the force of a spring that acts outwardly, i.e. presses the locking body outwardly. Due to the compressibility of the spring the locking body may be pushed back into the fixation protrusion if a respective force is exerted that overcomes the spring force. Therefore, when the fixation protrusion of a curtain rail component shall be inserted into a recess of another curtain rail component the locking body has to be slightly pressed into the receiving opening of the respective fixation protrusion such that the fixation protrusion together with the locking body may be completely inserted into the recess of the other curtain rail component. During the insertion process the locking body reaches and subsequently glides over an inner wall of the recess until the fixation protrusion is about to reach its final position, i.e. when the faces of the first end of one curtain rail component is about to flushly touch the face of the second end of the other curtain rail component. In this position the locking body reaches a through-hole that preferably perpendicularly extends from a lateral wall of the recess into the recess itself and consequently snaps into this through-hole by the action of the spring force. Thereby, both curtain rail components are fixed to each other. This positive locking connection can be released again by pushing the locking body back into the receiving opening of the fixation protrusion through the use of an elongated body either from the curtain slit or the holder slit, depending on where the through-hole of the other curtain rail component is positioned. It is apparent that the fixation protrusion must be pulled out of the recess at the same time.

In another advantageous embodiment the fixation protrusion comprises a through-hole that extends perpendicularly to the local longitudinal axis of the second end, wherein a through-hole having a thread extends perpendicularly to the local longitudinal axis of the first end through an inner wall of the recess. This allows the insertion and fastening of a screw through both through-holes for fastening two curtain rail components to each other. This positive locking may easily be achieved and disengaged as well.

In an alternate embodiment the first end may comprise a through-hole that extends perpendicularly to the local longitudinal axis of the curtain rail component. The fixation protrusion on the second end additionally has a threaded hole with an orientation that corresponds to the through-hole of the first end. Two curtain rail components with a fixation protrusion of a first curtain rail component inserted into a recess of a second curtain rail component may be locked together by a screw that is inserted into the through-hole of the second curtain rail component and screwed into the threaded hole of the first curtain rail component.

In another embodiment the fastening means is a locking means comprising an elongated body with a circular cross-section and at least one locking protrusion that extends perpendicularly to a longitudinal axis of the elongated body, wherein at least one lateral walling of the recess of the first end and the fixation protrusion of the second end comprise through-holes that extend perpendicularly from an outside through the first end and the second end, respectively and correspond to the cross-section of the elongated body with the at least one locking protrusion extending therefrom, wherein the position and orientation of the at least one through-hole of the first end corresponds with the position and orientation of the through-hole of the second end such that the locking body is insertable through the at least one through-hole of a first end of a first curtain rail component and a second end of a second curtain rail component in an assembled state. A combination of a first curtain rail component and a second curtain rail component with a fixation protrusion of the first curtain rail component inserted into the recess of the second curtain rail component thereby comprises two or three through-holes with the same extension direction, position and orientation. A first through-hole may extend from a lateral walling of the recess of the first end of the second curtain rail component into the recess of this first end. Directly thereafter a second trough-hole follows on, which second through-hole is located inside the fixation protrusion. On the opposite lateral wall of the recess another through-hole follows. As the elongated body of the locking means has at least one locking protrusion, for example a pin, perpendicularly extending therefrom its cross-section is not completely circular. For guiding the locking means through the lateral wallings of the recess and the fixation protrusion the through-holes require a shape that corresponds to this certain cross-section. Thereby, the locking means may only be inserted in certain discrete orientations completely through the combination of first and second curtain rail components. It may be possible that a first through-hole may have a larger shape that may equal a circular hole with a diameter exceeding the maximum local diameter of the elongated body with the at least one pin. Consequently, as the locking means may not be pulled out of the lateral walls and the fixation protrusion in other orientations a positive locking may be accomplished easily just through turning the locking means. A positive locking may thereby be accomplished either from the holder slit or from the curtain slit.

In a further advantageous embodiment the elongated body of the locking means comprises a radial projection on a side opposite to the at least one locking protrusion, wherein a spring is located between the radial projection and the at least one locking protrusion. After inserting the locking means the at least one locking protrusion is pressed onto the respective lateral walling of the recess. The spring thereby acts on the radial projection and the opposite walling of the recess if its through-hole corresponds to the shape of the locking means or on the fixation protrusion if the through-hole of the walling of the recess facing the radial projection has a larger diameter, as stated above. Thereby, the length of the elongated body may be selected such that the spring has enough space for allowing an additional compression, e.g. during the disabling of the locking function by pressing the locking means towards the fixation protrusion and turning it into the discrete orientation that allows to pull it out.

In a further exemplary embodiment a lateral walling of the recess of the first end of the curtain rail component comprises a receiving recess on a side facing away the recess into which a fixation protrusion is insertable. The receiving recess may thereby be designed to substantially completely receive the radial projection of the locking means in an inserted state for providing a smooth surface of the lateral walling.

In another exemplary embodiment a lateral walling of the recess of the first end comprises at least one receiving groove for receiving the at least one locking protrusion of the locking means when the locking means is turned from an insertion position into a locking position. Preferably under support of the spring as mentioned previously the locking means is pressed into the respective at least one receiving groove such that there is provided an advantageous and vibration-resistant positive locking.

In an exemplary embodiment the cross-section of each curtain rail component is symmetrical about at least one axis. Thereby, the curtain rail may be turned at least back to front and, when the curtain rail components are symmetrical about two axes they may also be positioned upside down. This improves the ability for providing an easy to manufacture aircraft cabin curtain rail without the probability of an error during the manufacture through a wrongly oriented curtain rail component. Furthermore, these curtain rail components may easily be manufactured in an industrial quantity.

The invention further relates to an aircraft cabin curtain rail made under use of an aircraft cabin curtain rail assembly kit as presented above.

The invention further relates to an aircraft with an aircraft cabin having at least one curtain supported on such an aircraft cabin curtain rail.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
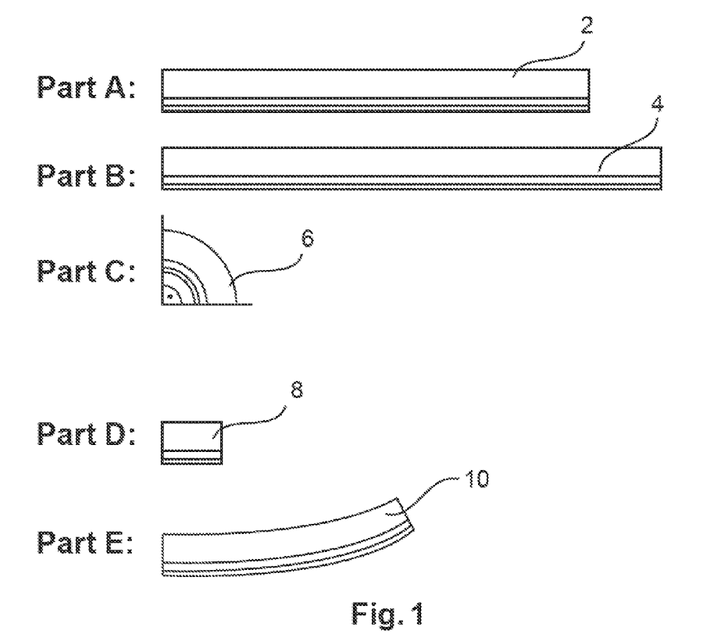
FIG. 1 shows a plurality of different curtain rail components as an aircraft cabin curtain rail assembly kit.

FIG. 1 shows an overview of a possible aircraft cabin curtain rail assembly kit. Exemplarily two linear or longitudinal curtain rail components 2 and 4 are named part "A" and part "B". Part A exemplarily has a length of 50 cm; part B exemplarily has a length of 60 cm. These dimensions allow creating an aircraft cabin curtain rail with a most common lateral extension for providing a cabin zone separation for the most common commercial aircraft. The respective passageways over which the aircraft cabin curtain rail to be created spans, usually comprise a certain lateral extension for allowing a person to walk through. Often, besides lateral extension also longitudinal extensions are necessary as cabin components that define these passageways may be shifted relative to each other in a longitudinal direction. In order to provide necessary directional changes exemplarily a curved curtain rail component 6 is provided as a part "C" that has a radius of curvature of 10 cm and a curvature angle of 90°. A further exemplary linear curtain rail component 8, part "D", is provided and has a length of 10 cm. A still further curtain rail component 10, part "E", is curved and has a curvature angle of about 10°.

The core aspect is to provide a plurality of different combinable curtain rail components that may form every necessary aircraft cabin curtain rail. Preferably one or more of the depicted variety of curtain rail components 2 to 10 create an aircraft cabin curtain rail that is tailored to an individual passageway in an aircraft cabin that is to be separated by means of a curtain.

Figure 2A:
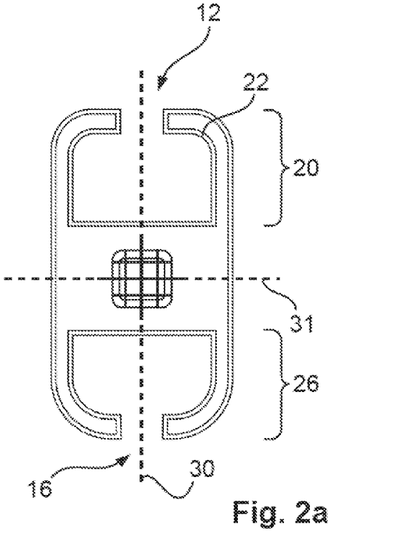
FIGS. 2a and 2b show different cross sections of curtain rail components.
Figure 2B:
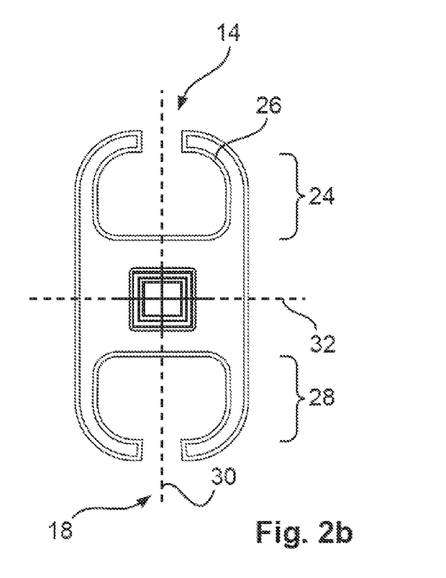

As demonstrated in FIGS. 2a and 2b the curtain rail components 2 to 10 comprise a holder slit 12 or 14 and a curtain slit 16 or 18. The curtain rail cross-section in FIG. 2a comprises an upper part 20 which is flat at its top and comprises the holder slit 12. Supporting brackets or slidable and clamping supporting bodies can be inserted into a hollow space 22 of the upper part 20 that allow the extension of fastening means from the hollow space 22 through the holder slit 12 into a panel, a body, a monument, or any other means to which the aircraft cabin curtain rail shall be mounted. With a flat top the upper part 20 of the aircraft cabin curtain rail of FIG. 2a may be easily pressed onto a planar surface so as to provide an additional directional stability of the aircraft cabin curtain rail.

In FIG. 2b there is demonstrated an upper part 24 of a curtain rail cross-section, wherein the upper part comprises a hollow space 26 that may be used similarly as the hollow space 22 of FIG. 2a. Exemplarily, the upper part 24 is completely rounded.

Basically, both cross-sections shown in FIG. 2a and FIG. 2b have a lower part 26 and 28 that are rounded and comprise the curtain slit 16 and 18 respectively. The curtain rail cross-section in FIG. 2a is symmetrical about a vertical axis 30 and the curtain rail cross-section in FIG. 2b is symmetrical about the vertical axis 30 and the horizontal axis 32.

Figure 3A:
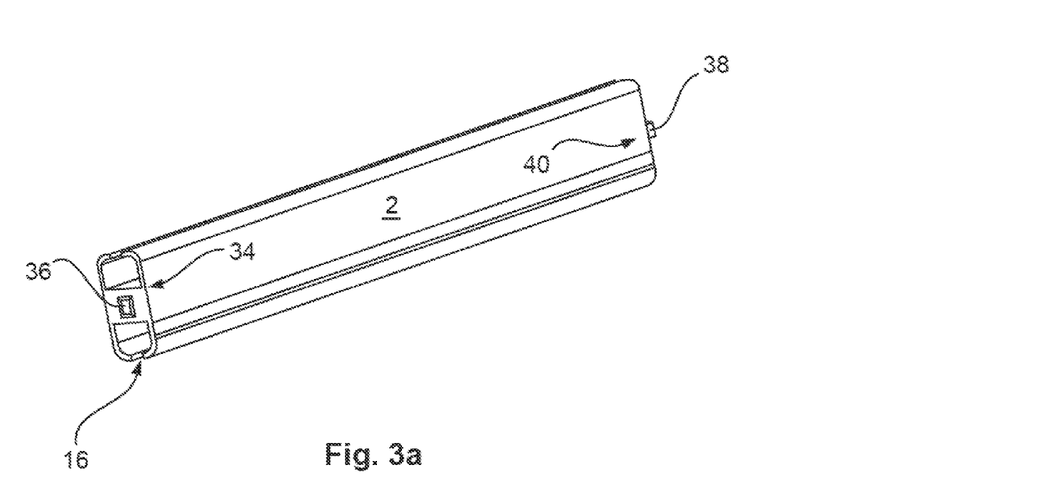
FIGS. 3a and 3b show a linear curtain rail component in two different directions.

FIG. 3a shows the linear curtain rail component 2, i.e. part A, in a three-dimensional view. A first end 34 has a recess 36 that is dimensioned to receive a fixation protrusion 38 of a second end 40. On the upper side, the curtain rail component 2 has a holder slit 12 by means of which the curtain rail component 2 may be mounted on another component. On the lower side, the curtain rail component 2 comprises a curtain slit 16 that allows inserting slidable curtain holders that are not depicted herein.

In this regard it is pointed out that each curtain rail component of the aircraft cabin curtain rail assembly kit according to the invention has a first end 34 with a recess 36 and a second end 40 with a fixation protrusion 38. Therefore, it is not the intention to insert the fixation protrusion 38 into the recess 36 of the same curtain rail component. Instead, each fixation protrusion 38 of a second end 40 of any curtain rail component may be inserted into the recess 36 of any other curtain rail component. Thereby, a chain of different curtain rail components create an individually tailored aircraft cabin curtain rail.

By inserting a fixation protrusion 38 into the recess 36 the holder slit 12 and the curtain slit 16 of two adjacent curtain rail components are exactly aligned relative to each other for allowing an unobstructed motion of the curtain or of any holders or brackets that are inserted into the hollow spaces of the curtain rail components. It therefore is feasible to use a non-circular cross section and preferably a rectangular cross-section for the fixation protrusion that provides an exact alignment.

Figure 3B:
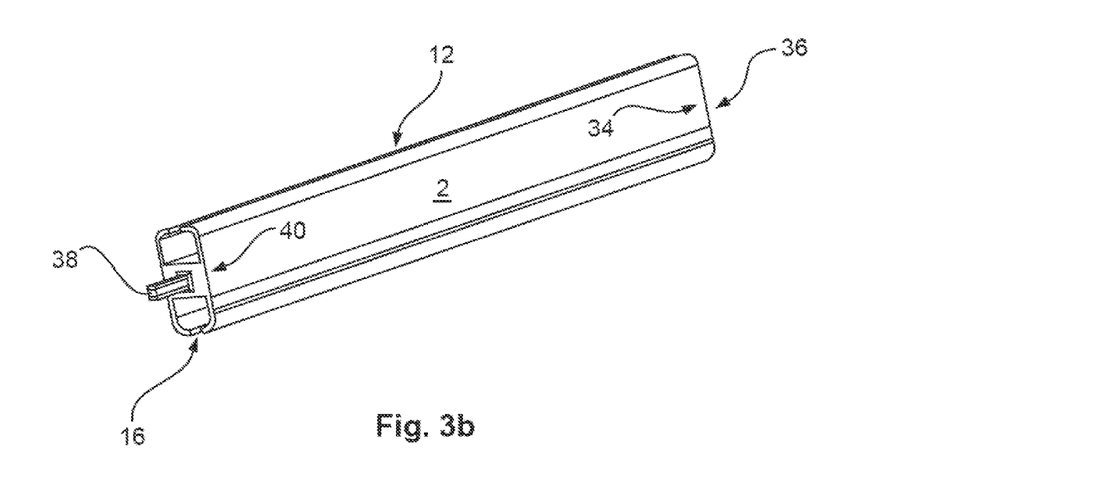

FIG. 3b shows the curtain rail component 2 back to front for an improved visibility of the fixation protrusion 38, which fixation protrusion 38 may be realized as an elongated extension having a non-circular, preferably rectangular cross section, for providing an optimal alignment function.

Figure 3C:
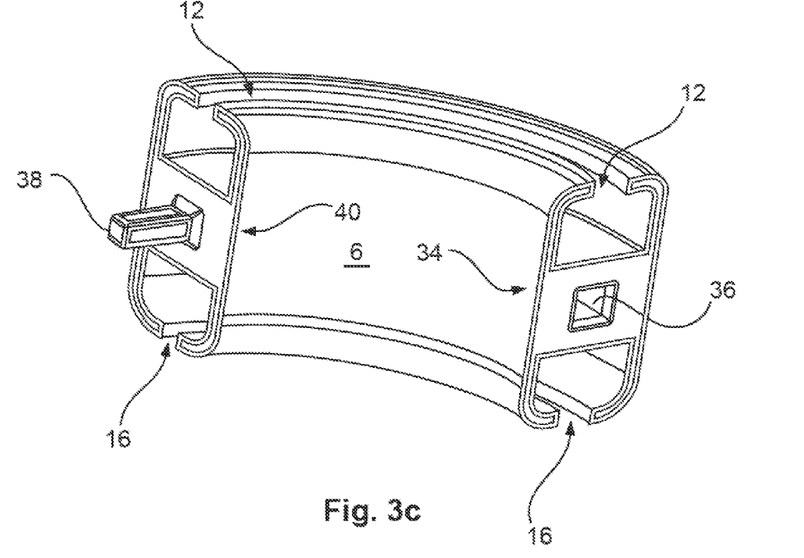
FIG. 3c shows a curved curtain rail component and FIG. 3d shows an aircraft cabin curtain rail assembled using linear and curved curtain rail components.

Furthermore, FIG. 3c shows the curved curtain rail component 6, i.e. part C, which curtain rail component 6 also has a first end 34 with a recess 36 and a second end 40 with a fixation protrusion 38.

Figure 3D:
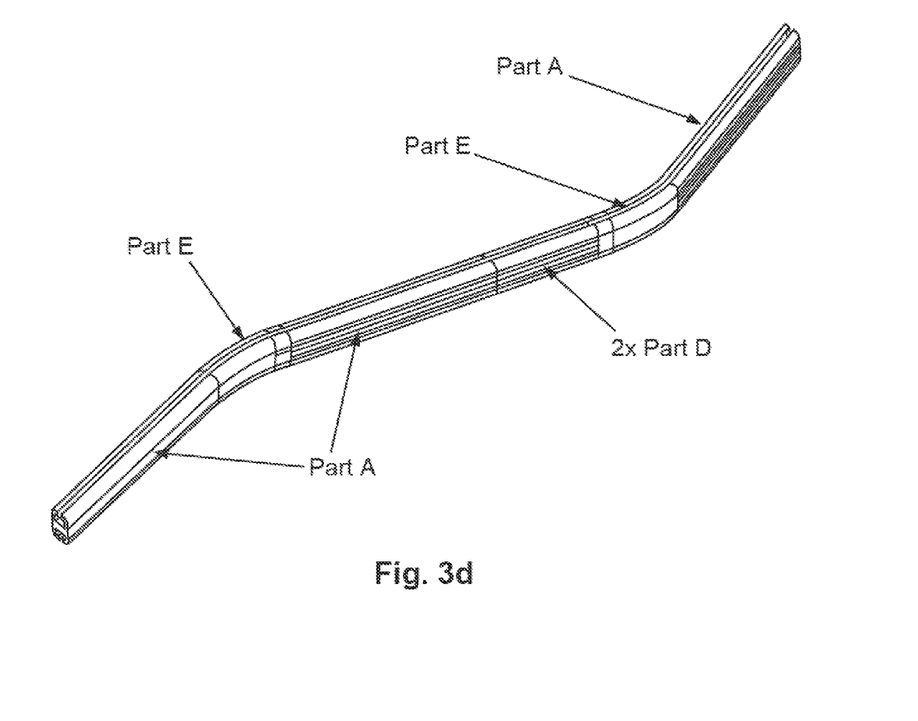

Further, FIG. 3d shows a number of different curtain rail components attached to each other to create an aircraft cabin curtain rail with an individually tailored geometrical shape. For example, on the top right a linear curtain rail component part A is used, afterwards a curved curtain rail component part E, afterwards two curtain rail components D, a curtain rail component part A, a curtain rail component part E and another curtain rail component part E. In the state-of-the-art this specific geometrical shape would have been created individually by bending or molding the aircraft cabin curtain rail.

Curtain rail components that are positioned relative to each other as shown in FIG. 3d need to be arrested in order to stay in their relative positions throughout their life time or until the respective cabin-layout is redesigned. For this purpose the fixation protrusion 38 and the recess 36 may be equipped with fastening means. A first exemplary embodiment is shown in FIGS. 4a to 4d.

Figure 4A:
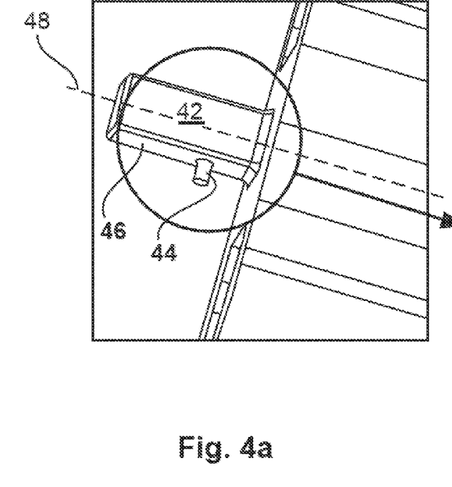
FIGS. 4a to 4d show a positive locking means for arresting a fixation protrusion and a recess.

FIG. 4a shows a fixation protrusion 42 that has a non-circular cross-section and comprises a locking body 44 that extends from a surface 46 of the fixation protrusion 42 perpendicularly to a local longitudinal axis 48 of the curtain rail component. This locking body enables a snap-in connection in a respective recess.

Figure 4B:
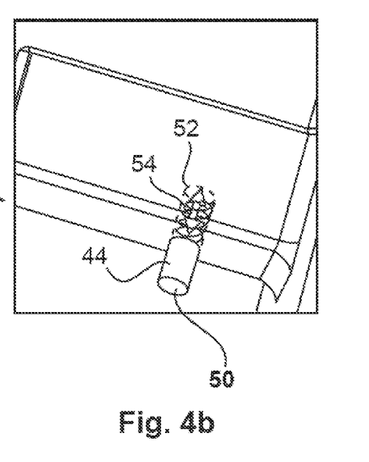

FIG. 4b shows a possible geometrical shape of the locking body 44 that may be rounded at an end 50 that faces away from the surface 46 in a magnified view. Preferably the locking body 50 is inserted into a receiving hole 52, in which receiving hole 52 a spring 54 may be inserted that constantly exerts an outwardly directed pushing force onto the locking body 50. By exerting a force onto the locking body 44 from an outside the locking body may be pressed back into the receiving hole.

Figure 4C:
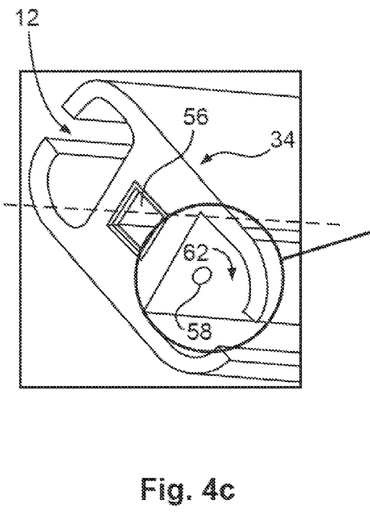
Figure 4D:
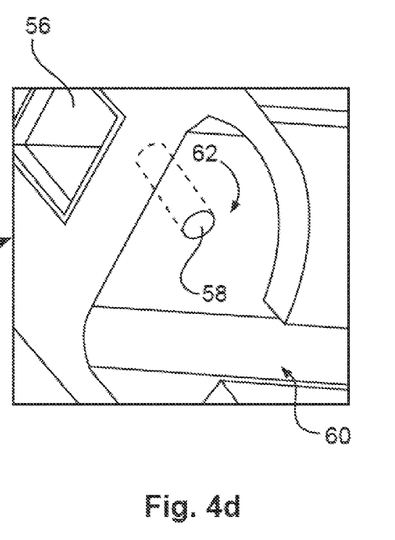

FIG. 4c shows a recess 56 into which the fixation protrusion 46 may be inserted. By pushing the locking body 44 into the receiving hole 52, e.g. by a finger or a tool, its end 50 ultimately disappears in the recess 56 until it is released by removing the finger or the tool. While reaching an opening 58 that extends from a lateral walling 62 of the recess 56 facing a slit 60 and extending into the recess 56, as visible from the magnified view in FIG. 4d, the locking body 44 snaps into the opening 58. The opening 58 is oriented perpendicularly to the local longitudinal axis 64 of the first end 34 of the curtain rail component shown in FIG. 4c and engages the locking body 44 in a positive fit connection. Thereby the slit 60 may either be a curtain slit or a support slit.

It may also possible to integrate two openings that extend to both sides of the respective curtain rail component if the cross-section of the curtain rail components is symmetrical to two axes, as shown in FIG. 2b.

Figure 5A:
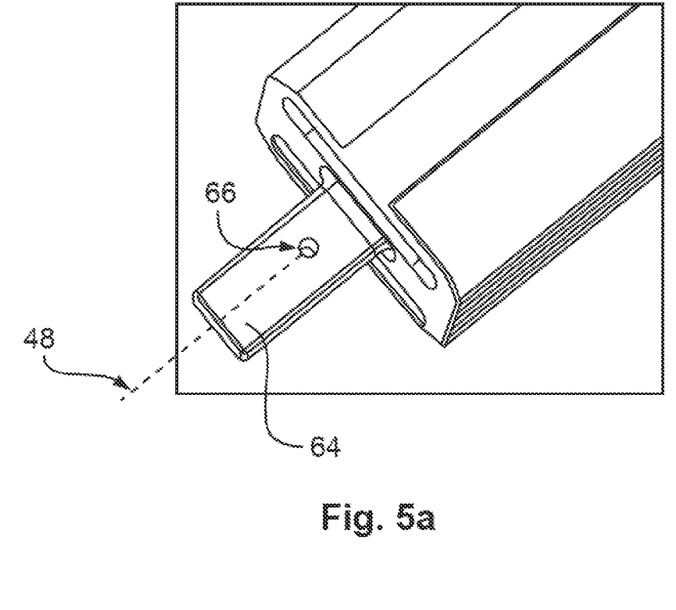
FIGS. 5a and 5b show another positive locking means for arresting a fixation protrusion and a recess.
Figure 5B:
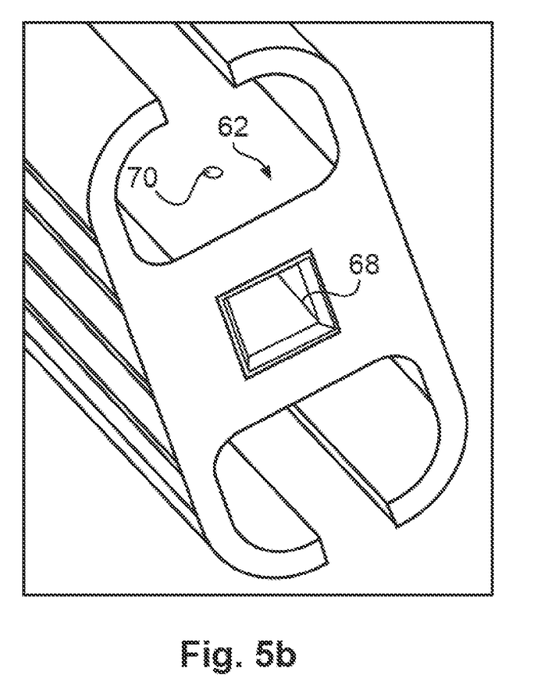

In another exemplary embodiment, as shown in FIGS. 5a and 5b, a fixation protrusion 64 may be equipped with a through-hole 66 that extends through the whole fixation protrusion 64 perpendicularly to its local longitudinal axis 48. As indicated in FIG. 5b the through-hole 66 corresponds to an opening 70 that extends through the lateral walling 62 into the recess 68 such that, when the fixation protrusion 64 is inserted into the recess 68, a screw may be inserted into the opening 70 and may be screwed into a thread at the opposite end of the recess 68.

In a modification of this exemplary embodiment the fixation protrusion 64 may have a thread in the through-hole 66 for screwing a screw directly into the thread of the through-hole 66. Thereby, the fixation may furthermore be simplified.

FIGS. 6a to 6f show a further exemplary embodiment in simplified three-dimensional views. For the sake of clarity wallings of a recess of a first end of a curtain rail component is simplified. The fixation protrusion is not depicted.

Figure 6A:
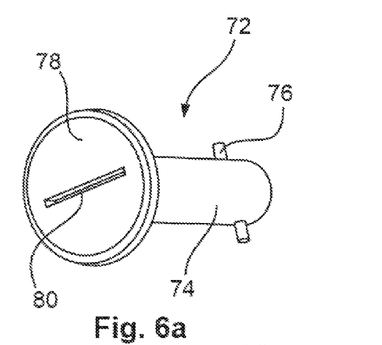
FIGS. 6a to 6f show another positive locking means for arresting a fixation protrusion and a recess.

FIG. 6a depicts a locking means 72 that comprises an elongated body 74 with a circular cross-section and a pin 76 that extends through the elongated body 74 perpendicularly to a longitudinal axis of the elongated body 74. At an opposite end of the pin 76 a radial projection 78 in the shape of a disc is present, which radial projection comprises a slit 80 for insertion of a screw-driver or a coin.

Figure 6B:
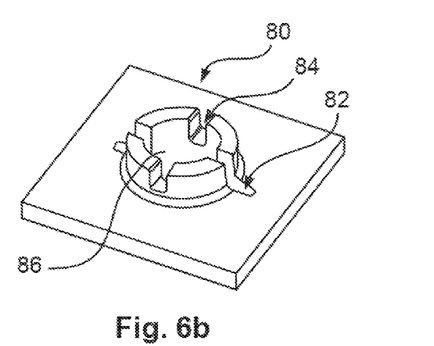

FIG. 6b demonstrates a part of a first end of a curtain rail component with a walling 80 of a recess that comprises a through-hole 82 with a shape that corresponds to the cross-section of the elongated body 74 with the pin 76 extending therefrom. This allows the insertion of the locking means 72 through the walling 80 in an insertion orientation or position. At a side facing away from the recess receiving slits 84 are located that allow receiving the pin 76 when turning the locking means 72 appropriately. If a fixation protrusion comprises a through-hole that corresponds with the through-hole 82 of the walling 80 of the recess, a combination of a first curtain rail component and a second curtain rail component with a fixation protrusion of the first curtain rail component inserted into the recess of the second curtain rail component may easily be locked relative to each other by inserting the locking means 72 and turning it into an appropriate locking orientation or position. The fixation protrusion thereby is held between the radial projection 78 and the walling 80 of the recess.

For further improving the connection between the pin 76 and the receiving slits 84 a spring may be put onto the elongated body 74 between the pin 76 and the radial projection 78 for exerting a constant force for pressing the pin 76 into the receiving slits 84.

Figure 6C:
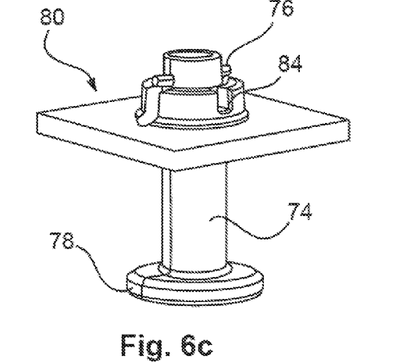
Figure 6D:
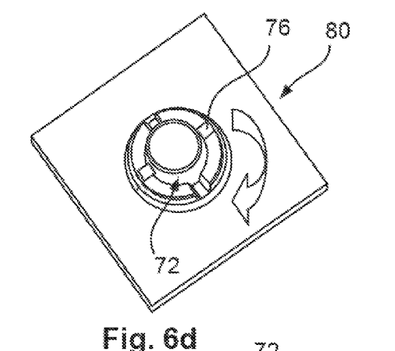

FIG. 6c shows the locking means 72 directly after insertion in an insertion orientation or direction, where the pin 76 extends over the lateral walling 80 before the rotation is initiated.

FIG. 6 d demonstrates the initiation of the rotation. The rotation may be accomplished by a screwdriver or another tool that is engageable with the slit 80.

Figure 6E:
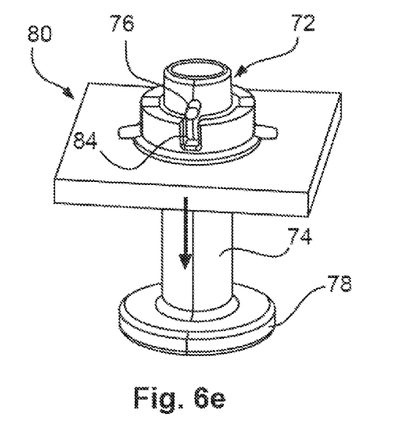

In FIG. 6e the rotation of the locking means 72 is completed and the pin 76 is situated over the receiving slits 84. The rotation may be accomplished about 90° for example.

Figure 6F:
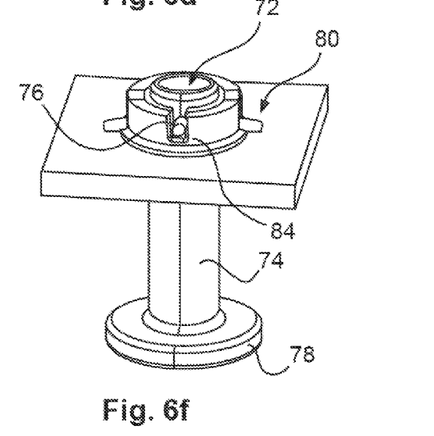

E.g. by exerting a spring force, in FIG. 6f the pin 76 is pressed into the receiving slits 84. In this locking orientation or position an improved positive locking is enabled.

Figure 7:
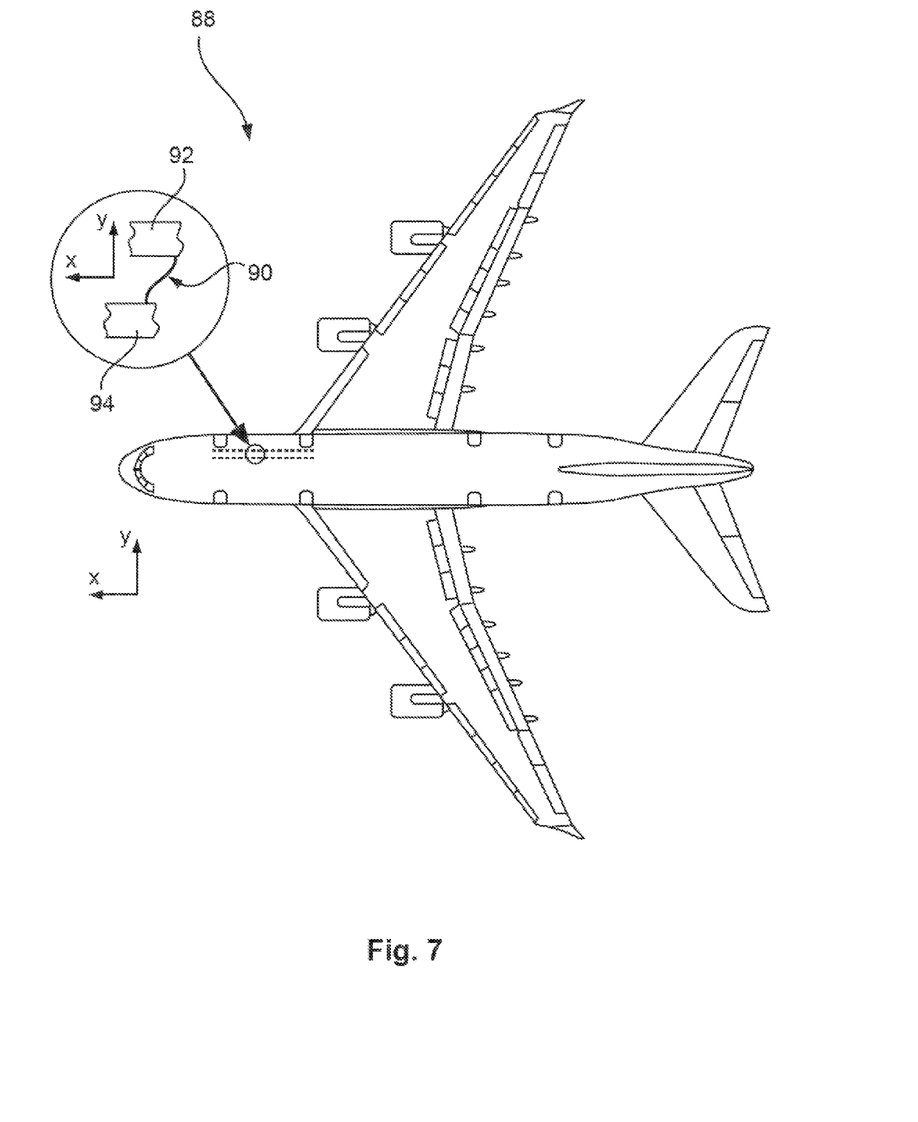
FIG. 7 shows an aircraft with a cabin and a curtain supported on an aircraft cabin curtain rail assembled by use of an aircraft cabin curtain rail assembly kit.

Finally, FIG. 7 shows an aircraft 88 with a cabin having a passageway defined through two cabin components 92 and 94, between which an aircraft cabin curtain rail 90 is mounted for holding a separation curtain. Thereby it is apparent that an aircraft cabin curtain rail 90 may not only extend in a lateral direction, i.e. along a y-axis of an aircraft-fixed coordinate system, but also in a longitudinal direction, i.e. along an x-axis of an aircraft-fixed coordinate system.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft cabin curtain rail assembly kit comprising:
 a plurality of curtain rail components comprising at least one linear curtain rail section and
 at least one curved curtain rail section with an angle of curvature in a range of 0-90°, wherein each curtain rail component has a first end and a second end, wherein, each curtain rail component comprises, on the first end, a recess for receiving a fixation protrusion of another curtain rail component and, on the second end, a fixation protrusion for inserting into a recess of another curtain rail component, wherein the recess and the fixation protrusion comprise a fastening means for fixing the recess and the fixation protrusion relative to each other; and wherein each curtain rail component comprises a holder slit for attaching the respective curtain rail component to an object and a curtain slit for guiding curtain rail guiding means in the curtain rail component.

2. The aircraft cabin curtain rail assembly kit of claim 1, wherein the fastening means is a releasable positive locking means.

3. The aircraft cabin curtain rail assembly kit of claim 1, wherein the fastening means comprises a locking body extending perpendicularly to a local longitudinal axis of the respective curtain rail component from the fixation protrusion and a hole in a walling of the recess of the first end and wherein the locking body is spring-mounted.

4. The aircraft cabin curtain rail assembly kit of claim 1, wherein the fixation protrusion comprises a through-hole perpendicularly to the local longitudinal axis of the second end, and wherein a through-hole extends through a walling of the recess perpendicularly to the local longitudinal axis of the first end and has a thread.

5. The aircraft cabin curtain rail assembly kit of claim 1, wherein the first end comprises a through-hole perpendicularly to the local longitudinal axis of the first end; and wherein the fixation protrusion has a threaded hole configured for receiving a screw into the fixation protrusion from either side of the other curtain rail component to provide for a positive locking.

6. The aircraft cabin curtain rail assembly kit of claim 1, wherein the fastening means is a locking means comprising an elongated body with a circular cross-section and at least one locking protrusion extending perpendicularly to a longitudinal axis of the elongated body, wherein at least one lateral walling of the recess of the first end and the fixation protrusion of the second end comprise through-holes extending perpendicularly from an outside through the first end and the second end, respectively, and corresponding to the cross-section of the elongated body with the at least one locking protrusion extending therefrom; and wherein the position and orientation of the at least one through-hole of the first end corresponds with the position and orientation of the through-hole of the second end such that the locking body is insertable through the at least one through-hole of a first end of a first curtain rail component and a second end of a second curtain rail component in an assembled state.

7. The aircraft cabin curtain rail assembly kit of claim 6, wherein the elongated body comprises a radial projection on a side opposite to the at least one locking protrusion; and wherein a spring is located between the radial projection and the at least one locking protrusion.

8. The aircraft cabin curtain rail assembly kit of claim 7, wherein a lateral walling of the recess of the first end of the curtain rail component comprises a receiving recess for receiving the radial projection on a side facing away the recess into which a fixation protrusion is insertable.

9. The aircraft cabin curtain rail assembly kit of claim 6, wherein a lateral walling of the recess of the first end of the curtain rail component comprises a receiving groove on a side facing away the recess into which a fixation protrusion is insertable.

10. The aircraft cabin curtain rail assembly kit of claim 6, wherein the locking protrusion is a pin.

11. The aircraft cabin curtain rail component of claim 1, wherein the cross-section of each curtain rail component is symmetrical about at least one axis.

12. An Aircraft cabin curtain rail made by an aircraft cabin curtain rail assembly kit, the kit comprising:

a plurality of curtain rail components comprising at least one linear curtain rail section; and at least one curved curtain rail section with an angle of curvature in a range of 0-90°, wherein each curtain rail component has a first end and a second end;

wherein, each curtain rail component comprises, on the first end, a recess for receiving a fixation protrusion of another curtain rail component and, on the second end, a fixation protrusion for inserting into a recess of another curtain rail component;

wherein the recess and the fixation protrusion comprise a fastening means for fixing the recess and the fixation protrusion relative to each other; and wherein each curtain rail component comprises a holder slit for attaching the respective curtain rail component to an object and a curtain slit for guiding curtain rail guiding means in the curtain rail component.

13. An aircraft having an aircraft cabin with at least one curtain supported on an aircraft cabin curtain rail made by an aircraft cabin curtain rail assembly kit of, the kit comprising:

a plurality of curtain rail components comprising at least one linear curtain rail section; and at least one curved curtain rail section with an angle of curvature in a range of 0-90°, wherein each curtain rail component has a first end and a second end;

wherein, each curtain rail component comprises, on the first end, a recess for receiving a fixation protrusion of another curtain rail component and, on the second end, a fixation protrusion for inserting into a recess of another curtain rail component;

wherein the recess and the fixation protrusion comprise a fastening means for fixing the recess and the fixation protrusion relative to each other; and wherein each curtain rail component comprises a holder slit for attaching the respective curtain rail component to an object and a curtain slit for guiding curtain rail guiding means in the curtain rail component.

* * * * *